United States Patent
Wan et al.

(10) Patent No.: US 11,662,500 B2
(45) Date of Patent: May 30, 2023

(54) SUBMARINE POSITION DETECTION METHOD BASED ON EXTREME POINTS OF GRAVITY GRADIENTS

(71) Applicant: China University of Geosciences (Beijing), Beijing (CN)

(72) Inventors: Xiaoyun Wan, Beijing (CN); Xianghang Zeng, Beijing (CN)

(73) Assignee: China University of Geosciences (Beijing), Beijing (CN)

( * ) Notice: Subject to any disclaimer, the term of this patent is extended or adjusted under 35 U.S.C. 154(b) by 336 days.

(21) Appl. No.: 17/017,526

(22) Filed: Sep. 10, 2020

(65) Prior Publication Data
US 2021/0263182 A1 Aug. 26, 2021

(30) Foreign Application Priority Data
Feb. 25, 2020 (CN) .......................... 202010110543.4

(51) Int. Cl.
*G01V 7/06* (2006.01)
*G01V 7/02* (2006.01)
*G01V 7/00* (2006.01)
*G08G 3/00* (2006.01)
*G01V 7/16* (2006.01)

(52) U.S. Cl.
CPC .................. *G01V 7/06* (2013.01); *G01V 7/00* (2013.01); *G01V 7/02* (2013.01); *G01V 7/16* (2013.01); *G08G 3/00* (2013.01)

(58) Field of Classification Search
CPC ... G01V 7/06; G01V 7/02; G01V 7/00; G08G 3/00
See application file for complete search history.

(56) References Cited

U.S. PATENT DOCUMENTS

| | | | | |
|---|---|---|---|---|
| 5,912,643 A | * | 6/1999 | Chew | G01C 21/16 342/457 |
| 6,185,502 B1 | * | 2/2001 | Sumner | G01C 21/165 702/92 |
| 2019/0277998 A1 | * | 9/2019 | Wodin | G01V 7/12 |

* cited by examiner

*Primary Examiner* — Paul M. West
(74) *Attorney, Agent, or Firm* — Slater Matsil, LLP

(57) ABSTRACT

The present disclosure discloses a submarine position detection method based on extreme points of gravity gradients. A space rectangular coordinate system is established by taking a centroid of the middle cylindrical portion as a coordinate origin, a direction pointing to a bow is taken as a forward direction of the X axis, a direction pointing to a port is taken as a forward direction of the Y direction, and a vertical upward direction is taken as a forward direction of the Z axis. The detection method includes steps of: determining a horizontal position of a submarine, i.e., coordinates (X, Y), according to a position of a central extreme point and a central position between extreme points of non-diagonal components of a gradient tensor; and determining a functional relation between a depth and the extreme points of gravity gradients by using the submarine model.

5 Claims, 5 Drawing Sheets

SUBMARINE POSITION DETECTION METHOD BASED ON EXTREME POINTS OF GRAVITY GRADIENTS

CROSS-REFERENCE TO RELATED APPLICATIONS

This application claims priority to Chinese Patent Application No. 202010110543.4, filed on Feb. 25, 2020, which is hereby incorporated by reference in its entirety.

TECHNICAL FIELD

The present disclosure belongs to the technical field of submarine position detection, and particularly relates to a submarine position detection method based on extreme points of gravity gradient.

BACKGROUND

With respect to elements of a gravity field, gravity gradients are second derivatives of gravity potential and can reflect a change rate of the gravity field in space. The gravity gradient has better resolution than gravity, and is more advantageous in detecting shallow objects. After years of development, the precision of a gravity gradiometer can reach $10^{-4}$ E at present, and the precision of a superconducting gravity gradiometer can reach $10^{-6}$ E in the future. It is highly feasible to use high-precision gravity gradient data for submarine detection.

At present, many scholars have done research on detecting the contour, position and mass of objects by gravity gradient. Some scholars use gravity gradient to detect underwater obstacles, so as to improve the safety of underwater submarines. Some scholars have studied the possibility of using airborne gravity gradient measurement to detect submarines. Some scholars have pointed out that the shape and horizontal position of an object can be determined by an extreme point of gravity gradient in the horizontal direction. Some scholars have proposed a method for estimating a depth of an object by using gravity gradient invariants. Some scholars have proposed a method for estimating a position of an underground object by tensor Euler deconvolution. Some scholars have suggested to use a gravity gradient tensor and an eigenvalue of the gravity gradient tensor to determine a position of an object. Many scholars have also studied how to use gravity anomaly and gravity gradient to deduce a position and mass of an object by taking the object as a point source.

In order to accurately determine a three-dimensional position of a submarine and make it still applicable in a complex environment, we propose a submarine position detection method based on extreme points of gravity gradients.

SUMMARY

These and other problems are generally solved or circumvented, and technical advantages are generally achieved, by embodiments of the present disclosure which provides a submarine position detection method based on extreme points of gravity gradients, and which can accurately determine a three-dimensional position of a submarine and is still applicable in a complex environment.

In order to achieve the foregoing objective, the present disclosure provides the following technical solutions: a submarine position detection method based on extreme points of gravity gradients, where a submarine model is composed of a hemispherical head, a middle cylindrical portion, a conical tail and an internal cylindrical pressure-resistant cabin. A space rectangular coordinate system is established by taking a centroid of the middle cylindrical portion as a coordinate origin, a direction pointing to a bow is taken as a forward direction of the X axis, a direction pointing to a port is taken as a forward direction of the Y direction, and a vertical upward direction is taken as a forward direction of the Z axis. The detection method includes the following steps:

step 1: determining a horizontal position of a submarine, i.e., coordinates (X, Y), according to a position of a central extreme point and a central position between extreme points of non-diagonal components of a gradient tensor;

step 2: determining a functional relation between a depth of the submarine and the extreme points of gravity gradients by using the submarine model;

step 3: deducing a depth of the submarine according to the observed extreme point of gravity gradients, and transferring to a corresponding coordinate system to obtain Z; and step 4: obtaining (X, Y, Z) by combining the results of step 1 and step 3.

Preferably, the gravity gradients generated by the submarine can be divided into two parts: one is gravity gradients generated by a submarine shell, and the other is gravity gradients generated by the mass defect caused by the cylindrical pressure-resistant cabin 2 of the submarine.

In one embodiment, theoretically, as the submarine depth changes, horizontal coordinates of the extreme point of each gravity gradient component at a specific altitude also changes.

In one embodiment, coordinates of extreme points with a vertical distance from the submarine to an observation point being 100-1000 m are calculated.

In one embodiment, solution is performed by jointly using a plurality of extreme points of gradient components.

Compared with the prior art, the present disclosure has the following beneficial effects:

(1) A three-dimensional position of a submarine can be accurately determined and the method has desirable robustness and can be still used in a complex environment.

(2) Solution is performed by jointly using a plurality of extreme points of gradient components.

The foregoing has outlined rather broadly the features and technical advantages of the present disclosure in order that the detailed description of the disclosure that follows may be better understood. Additional features and advantages of the disclosure will be described hereinafter which form the subject of the claims of the disclosure. It should be appreciated by those skilled in the art that the conception and specific embodiment disclosed may be readily utilized as a basis for modifying or designing other structures or processes for carrying out the same purposes of the present disclosure. It should also be realized by those skilled in the art that such equivalent constructions do not depart from the spirit and scope of the disclosure as set forth in the appended claims.

BRIEF DESCRIPTION OF THE DRAWINGS

For a more complete understanding of the present disclosure, and the advantages thereof, reference is now made to the following descriptions taken in conjunction with the accompanying drawings, in which.

Figure 1:
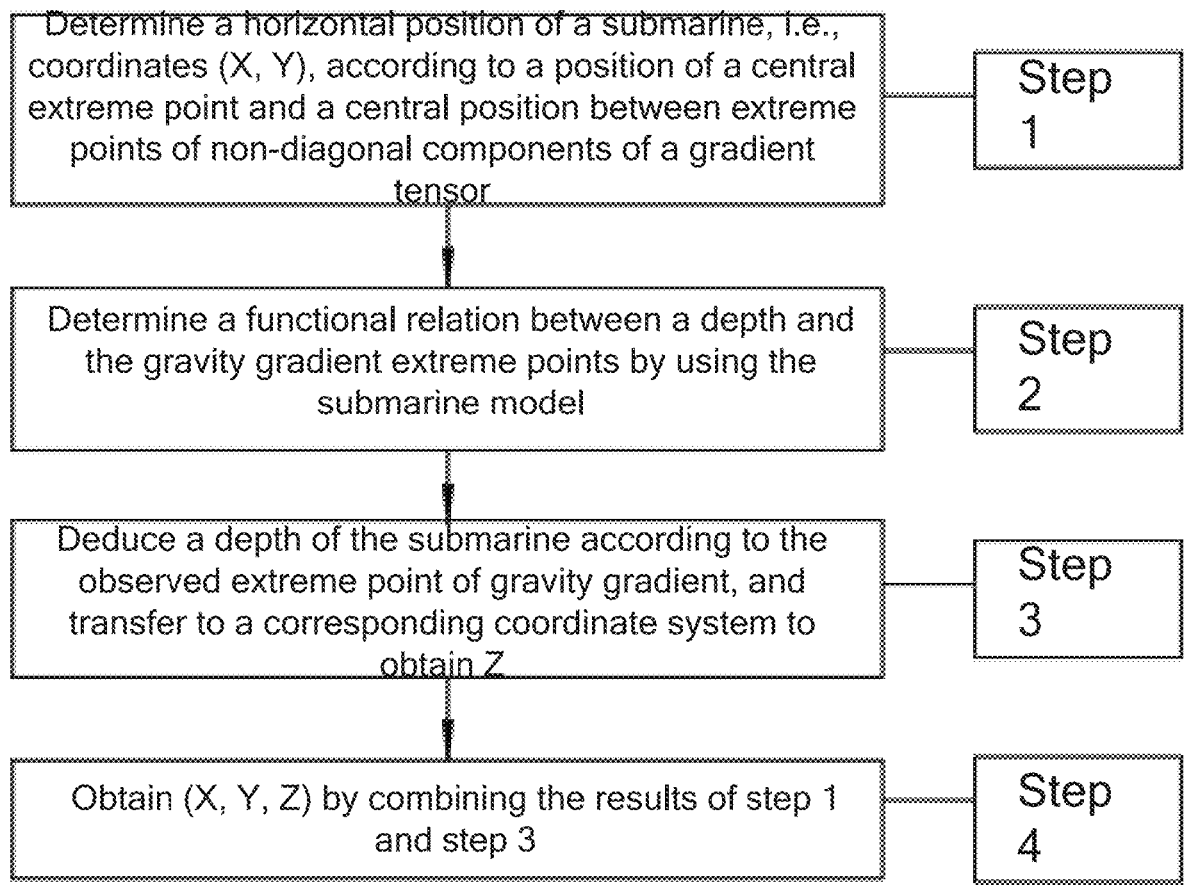
FIG. 1 is a flowchart of a detection method according to an embodiment of the present disclosure.
Figure 2:
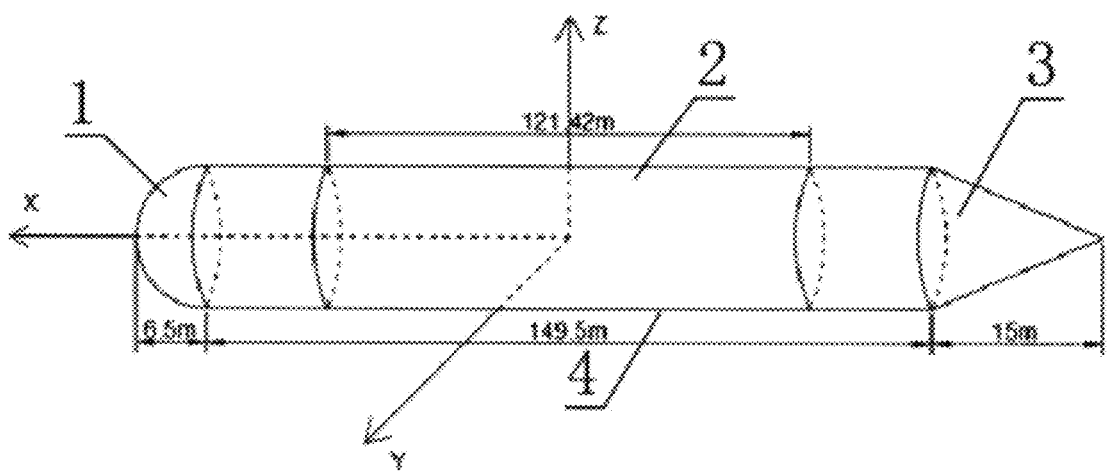
FIG. 2 is a schematic structural diagram of a submarine model according to an embodiment of the present disclosure.

In the figure: 1. hemispherical head; 2. cylindrical pressure-resistant cabin; 3. conical tail; 4. middle cylindrical portion.

Corresponding numerals and symbols in the different figures generally refer to corresponding parts unless otherwise indicated. The figures are drawn to clearly illustrate the relevant aspects of the various embodiments and are not necessarily drawn to scale.

DETAILED DESCRIPTION OF ILLUSTRATIVE EMBODIMENTS

The making and using of the embodiments of this disclosure are discussed in detail below. It should be appreciated, however, that the concepts disclosed herein can be embodied in a wide variety of specific contexts. The specific embodiments discussed are merely illustrative, and do not limit the scope of the claims.

The following clearly and completely describes the technical solutions in the examples of the present disclosure with reference to accompanying drawings in the examples of the present disclosure. Apparently, the described examples are merely some rather than all of the examples of the present disclosure. All other examples obtained by a person of ordinary skill in the art based on the examples of the present disclosure without creative efforts shall fall within the protection scope of the present disclosure.

Referring to FIGS. 1, 2, 3, 4, 5, 6, 7, 8 and 9, the present disclosure provides a technical solution: a submarine position detection method based on extreme points of gravity gradients. A submarine model is composed of a hemispherical head 1, a middle cylindrical portion 4, a conical tail 3 and an internal cylindrical pressure-resistant cabin 2, where the hemispherical head 1 has a radius of 13 m, the middle cylindrical portion 4 has a length of 149.5 m, the conical tail 3 has a length of 15 m, the cylindrical pressure-resistant cabin 2 has a length of 121.42 m and a radius of 13 m, and a shell has a surface density of 247.58 g/cm². A space rectangular coordinate system is established by taking a centroid of the middle cylindrical portion 4 as a coordinate origin, a direction pointing to a bow is taken as a forward direction of the X axis, a direction pointing to a port is taken as a forward direction of the Y direction, and a vertical upward direction is taken as a forward direction of the Z axis.

The gravity gradients generated by the submarine can be divided into two parts: one is gravity gradients generated by a submarine shell, and the other is gravity gradients generated by the mass defect caused by the pressure-resistant cabin 2 of the submarine. Six gravity gradient components generated by the shell and the cylindrical pressure-resistant cabin 2 are directly given without deduction, and respectively represented by formulas (1) and (2) below:

$$\begin{cases} V_{1xx} = G\sigma \iint \dfrac{2(X-x)^2 - (Y-y)^2 - (Z-z)^2}{[(X-x)^2 + (Y-y)^2 + (Z-z)^2]^{\frac{5}{2}}} ds \\[4pt] V_{1yy} = G\sigma \iint \dfrac{2(Y-y)^2 - (X-x)^2 - (Z-z)^2}{[(X-x)^2 + (Y-y)^2 + (Z-z)^2]^{\frac{5}{2}}} ds \\[4pt] V_{1zz} = G\sigma \iint \dfrac{2(Z-z)^2 - (X-x)^2 - (Y-y)^2}{[(X-x)^2 + (Y-y)^2 + (Z-z)^2]^{\frac{5}{2}}} ds \\[4pt] V_{1xy} = G\sigma \iint \dfrac{3(X-x)(Y-y)}{[(X-x)^2 + (Y-y)^2 + (Z-z)^2]^{\frac{5}{2}}} ds \\[4pt] V_{1xz} = G\sigma \iint \dfrac{3(X-x)(Z-z)}{[(X-x)^2 + (Y-y)^2 + (Z-z)^2]^{\frac{5}{2}}} ds \\[4pt] V_{1yz} = G\sigma \iint \dfrac{3(Y-y)(Z-z)}{[(X-x)^2 + (Y-y)^2 + (Z-z)^2]^{\frac{5}{2}}} ds \end{cases} \quad (1)$$

$$\begin{cases} V_{2xx} = -G\rho \iiint \dfrac{2(X-x)^2 - (Y-y)^2 - (Z-z)^2}{\left[(X-x)^2 + (Y-y)^2 + (Z-z)^2\right]^{\frac{5}{2}}} x\,dy\,dz \\[4pt] V_{2yy} = -G\rho \iiint \dfrac{2(Y-y)^2 - (X-x)^2 - (Z-z)^2}{\left[(X-x)^2 + (Y-y)^2 + (Z-z)^2\right]^{\frac{5}{2}}} x\,dy\,dz \\[4pt] V_{2zz} = -G\rho \iiint \dfrac{2(Z-z)^2 - (X-x)^2 - (Y-y)^2}{\left[(X-x)^2 + (Y-y)^2 + (Z-z)^2\right]^{\frac{5}{2}}} x\,dy\,dz \\[4pt] V_{2xy} = -G\rho \iiint \dfrac{3(X-x)(Y-y)}{\left[(X-x)^2 + (Y-y)^2 + (Z-z)^2\right]^{\frac{5}{2}}} x\,dy\,dz \\[4pt] V_{2xz} = -G\rho \iiint \dfrac{3(X-x)(Z-z)}{\left[(X-x)^2 + (Y-y)^2 + (Z-z)^2\right]^{\frac{5}{2}}} x\,dy\,dz \\[4pt] V_{2yz} = -G\rho \iiint \dfrac{3(Y-y)(Z-z)}{\left[(X-x)^2 + (Y-y)^2 + (Z-z)^2\right]^{\frac{5}{2}}} x\,dy\,dz \end{cases} \quad (2)$$

where σ is the surface density of the submarine shell, ρ is the sea water density and is 1.03 g/cm³, and the final gravity gradient of the submarine is the sum of gravity gradient produced by the submarine shell and mass defect of the pressure-resistant cabin of the submarine, namely $$V_{ij}=V_{1ij}+V_{2ij} \ (i=x, y; j=x, y) \quad (3)$$

Figure 3:
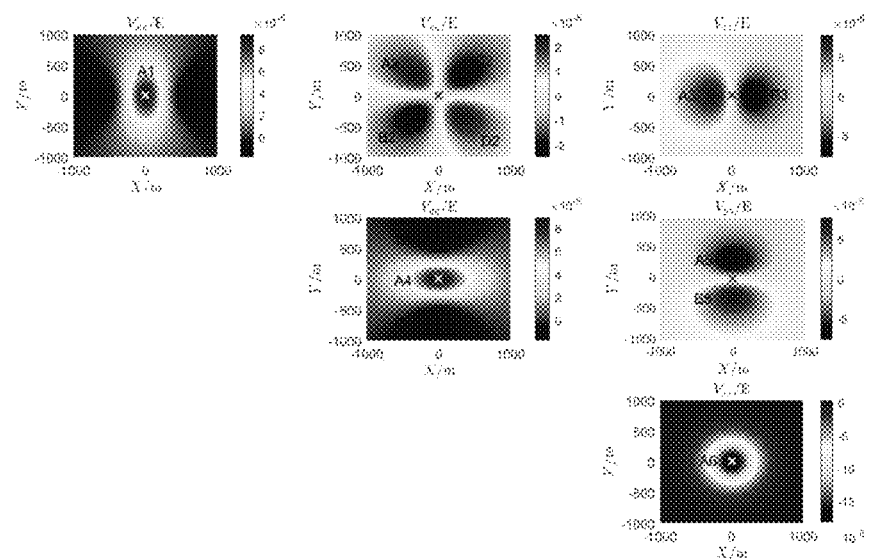
FIG. 3 is a schematic structural diagram of six gravity gradient components ($V_{xx}$, $V_{xy}$, $V_{xz}$, $V_{yy}$, $V_{yz}$ and $V_{zz}$) generated at 600 m above a submarine according to an embodiment of the present disclosure.

According to the above, the gravity gradients generated above the submarine can be calculated. Taking 600 m above the submarine as an example, the observed gravity gradient is shown in FIG. 3.

The submarine position detection method includes the following steps.

Step 1: determine a horizontal position of a submarine, i.e., coordinates (X, Y), according to a position of a central extreme point and a central position between extreme points of non-diagonal components of a gradient tensor.

Step 2: determine a functional relation between a depth and the extreme points of gravity gradient by using the submarine model.

Step 3: deduce a depth of the submarine according to the observed extreme point of gravity gradient, and transfer to a corresponding coordinate system to obtain Z.

Step 4: obtain (X, Y, Z) by combining the results of step 1 and step 3.

In this example, preferably, theoretically, as the submarine depth changes, horizontal coordinates of the extreme point of each gravity gradient component at a specific altitude also changes.

Figure 4:
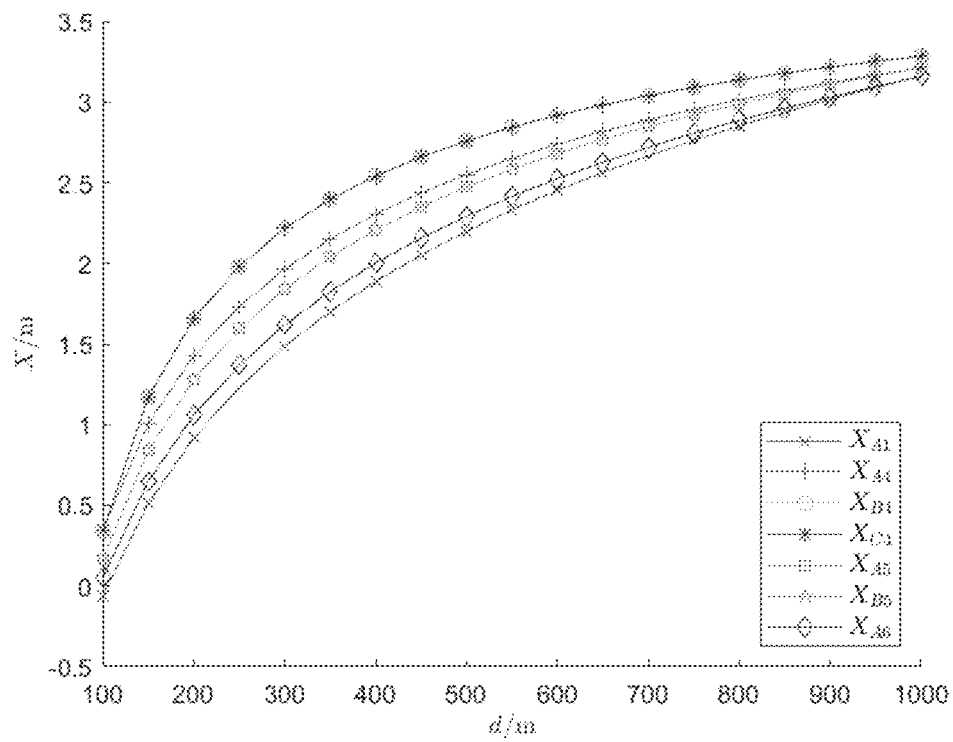
FIG. 4 is a first schematic structural diagram showing a relationship between submarine extreme point coordinates $X_{A1}$, $X_{A4}$, $X_{B4}$, $X_{C4}$, $X_{A5}$, $X_{B5}$ and $X_{A6}$ and a vertical distance from the submarine to an observation point according to an embodiment of the present disclosure.
Figure 5:
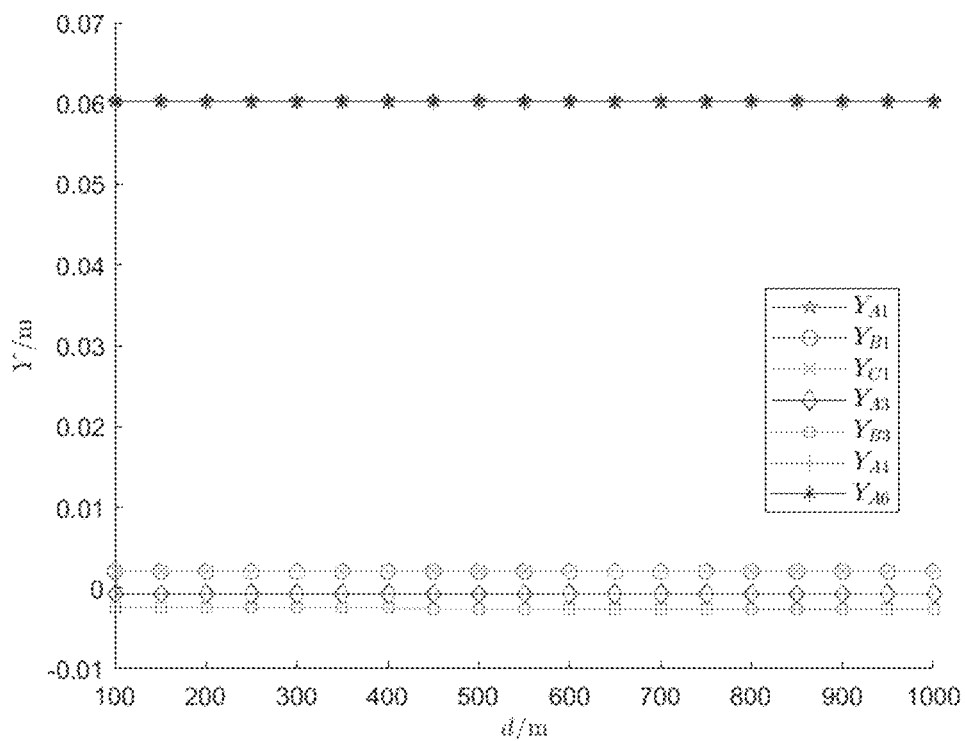
FIG. 5 is a second schematic structural diagram showing a relationship between submarine extreme point coordinates $Y_{A1}$, $Y_{B1}$, $Y_{C1}$, $Y_{A3}$, $Y_{B3}$, $Y_{A4}$ and $Y_{A6}$ and the vertical distance from the submarine to the observation point according to an embodiment of the present disclosure.
Figure 6:
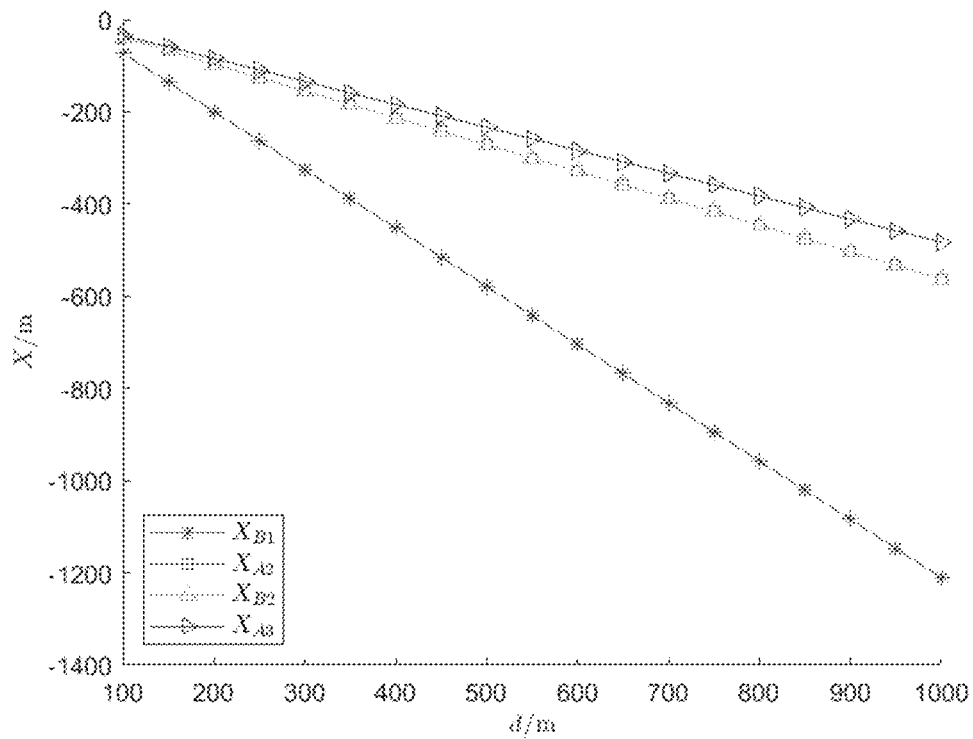
FIG. 6 is a third schematic structural diagram showing a relationship between submarine extreme point coordinates $X_{B1}$, $X_{A2}$, $X_{B2}$ and $X_{A3}$ and the vertical distance from the submarine to the observation point according to an embodiment of the present disclosure.
Figure 7:
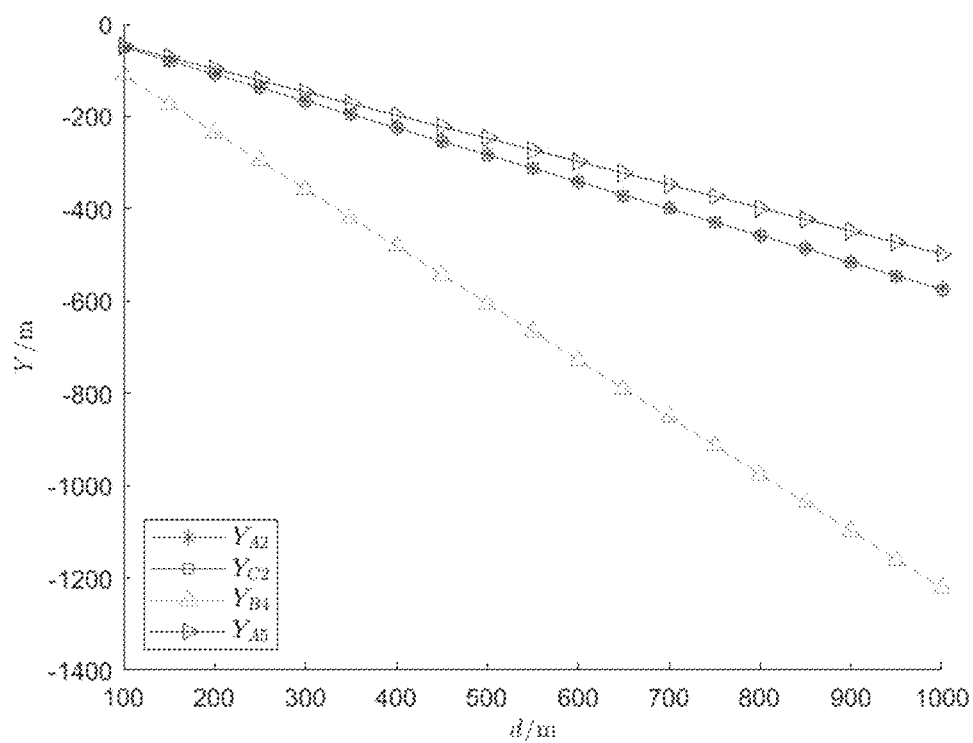
FIG. 7 is a fourth schematic structural diagram showing a relationship between submarine extreme point coordinates $Y_{A2}$, $Y_{C2}$, $Y_{B4}$ and $Y_{A5}$ and a vertical distance from the submarine to the observation point according to an embodiment of the present disclosure.
Figure 8:
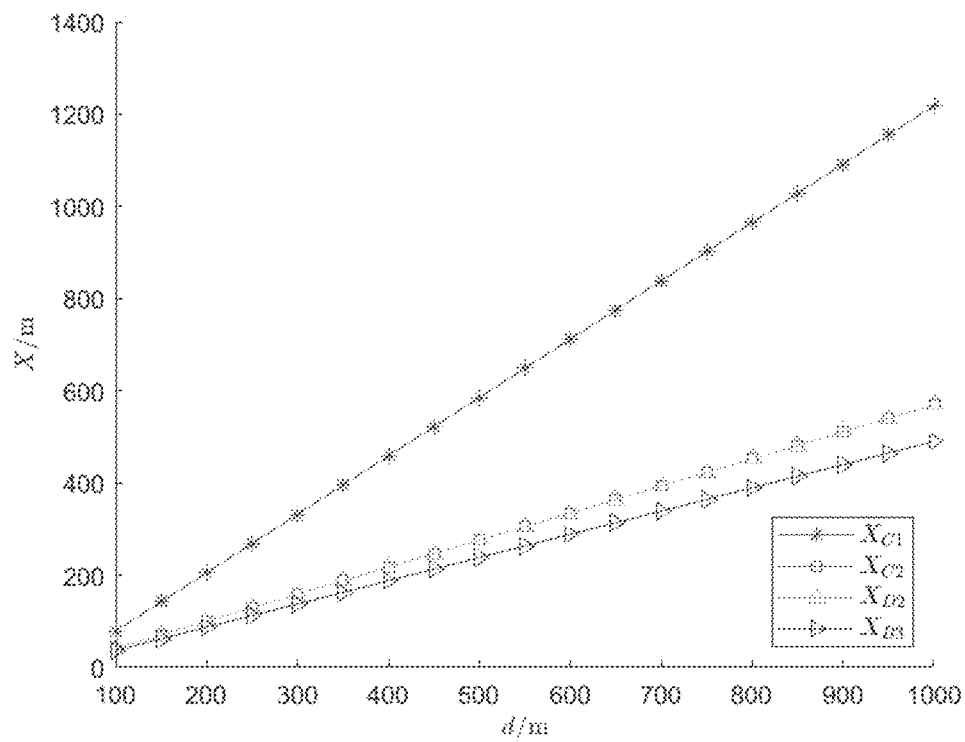
FIG. 8 is a fifth schematic structural diagram showing a relationship between submarine extreme point coordinates $X_{C1}$, $X_{C2}$, $X_{D2}$ and $X_{B3}$ and the vertical distance from the submarine to the observation point according to an embodiment of the present disclosure.
Figure 9:
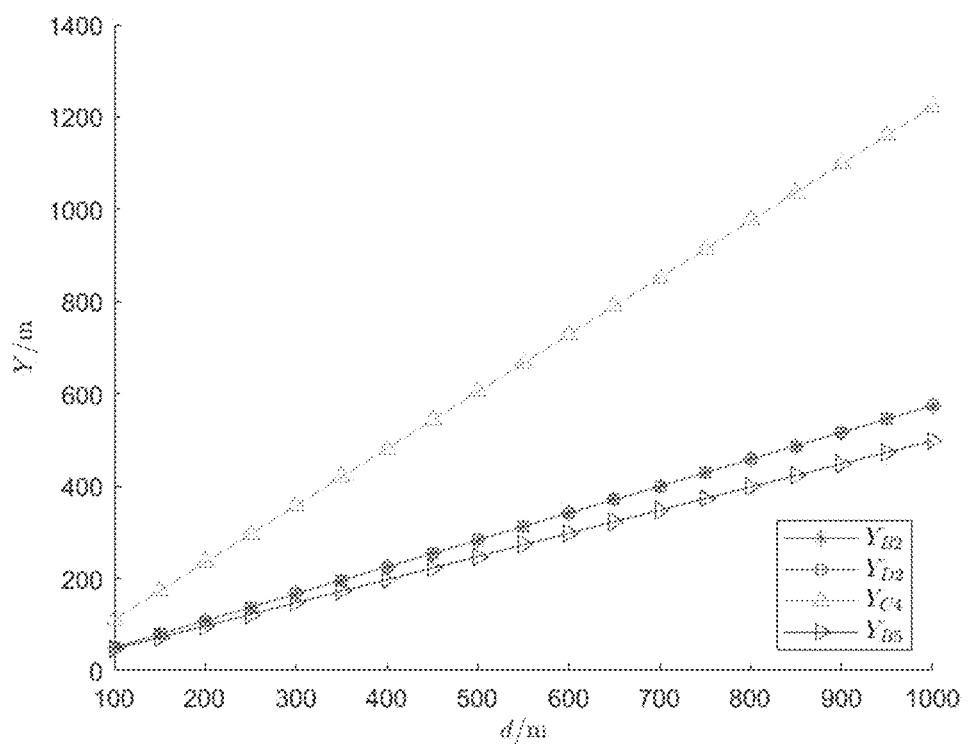
FIG. 9 is a sixth schematic structural diagram showing a relationship between submarine extreme point coordinates $Y_{B2}$, $X_{D2}$, $Y_{C4}$ and $X_{B5}$ and the vertical distance from the submarine to the observation point according to an embodiment of the present disclosure.

In this example, preferably, the coordinates of extreme points with a vertical distance from the submarine to an observation point being 100-1000 m were analyzed through a group of numerical experiments. Due to the limitation of the accuracy of a gravity gradiometer, the effective range of a submarine detection height is moo m, so in the present disclosure, the coordinates of extreme points with a vertical distance from the submarine to an observation point being mo-moo m were calculated. The relationship between the vertical distance from the submarine to the observation point and the extreme point coordinates is shown in FIGS. 4 to 9, where FIG. 4 shows the relationship that $X_{A1}$, $X_{A4}$, $X_{B4}$, $X_{C4}$, $X_{A5}$, $X_{B5}$ and $X_{A6}$ change with d. These variables change with d non-linearly, and have a small range of variation with d, so they are unsuitable for deducing the depth of the submarine. FIG. 5 shows the relationship that $Y_{A1}$, $Y_{B1}$, $Y_{C1}$, $Y_{A3}$, $Y_{B3}$, $Y_{A4}$ and $Y_{A6}$ change with d. These variables do not change with d, and thus are unsuitable for deducing the depth of the submarine. FIG. 6 shows the relationship that $X_{B1}$, $X_{A2}$, $X_{B2}$ and $X_{A3}$ change with d. FIG. 7 shows the relationship that $Y_{A2}$, $Y_{C2}$, $Y_{B4}$ and $Y_{A5}$ change with d. FIG. 8 shows the relationship that $X_{C1}$, $X_{C2}$, $X_{D2}$ and $X_{B3}$ change with d. FIG. 9 shows the relationship that $Y_{B2}$, $X_{D2}$, $Y_{C4}$ and $Y_{B5}$ change with d. The variables of FIGS. 6 to 9 change with d linearly, and the changes with height are large, so they are suitable for deducing the depth of the submarine. By using these variables, the present disclosure further determines the interrelationship between each coordinate and the vertical distance through a least square algorithm, and the results are shown in formulas (5-10):

$$\begin{cases} X_{A1} = \frac{-172.9297}{d^{0.0085}} + 166.2401, \ Y_{A1} = 0.0603 \\ X_{B1} = -1.2639d + 53.5005, \ Y_{B1} = 0.0020 \\ X_{C1} = 1.2664d - 47.7261, \ Y_{C1} = 0.0020 \end{cases} \quad (5)$$

$$\begin{cases} X_{A2} = -0.5816d + 19.7724, \ Y_{A2} = -0.5830d + 8.3924 \\ X_{B2} = -0.5815d + 19.7240, \ Y_{B2} = 0.5831d - 8.4583 \\ X_{C2} = 0.5869d - 17.3083, \ Y_{C2} = -0.5829d + 8.0917 \\ X_{D2} = 0.5870d - 17.3614, \ Y_{D2} = 0.5828d - 8.0516 \end{cases} \quad (6)$$

$$\begin{cases} X_{A3} = -0.4978d + 15.2091, \ Y_{A3} = -1.1405 \times 10^{-7}d - 7 \times 10^{-4} \\ X_{B3} = 0.5038d - 13.4695, \ Y_{B3} = -1.9008 \times 10^{-7}d - 0.0024 \end{cases} \quad (7)$$

$$\begin{cases} X_{A4} = \frac{-23.1460}{d^{0.3052}} + 6.0236, \ Y_{A4} = 0.0603 \\ X_{B4} = \frac{-55.9930}{d^{0.5720}} + 4.3604, \ Y_{B4} = -1.2343d + 12.3085 \\ X_{C4} = \frac{-55.9548}{d^{0.5718}} + 4.3616, \ Y_{C4} = 1.2343d - 12.3100 \end{cases} \quad (8)$$

$$\begin{cases} X_{A5} = \frac{-22.0907}{d^{0.2530}} + 7.0582, \ Y_{A5} = -0.5019d + 3.4077 \\ X_{B5} = \frac{-21.8708}{d^{0.2476}} + 7.1683, \ Y_{B5} = 0.5018d - 3.3806 \end{cases} \quad (9)$$

$$X_{A6} = \frac{-24.6826}{d^{0.0933}} + 16.1134, \ Y_{A6} = 0.0603 \quad (10)$$

The vertical distance from the submarine to the observation point can be calculated through the coordinates of extreme points in the horizontal direction by using formulas (5-10). In the present disclosure, six heights (459 m, 573 m, 610 m, 780 m, 846 m and 927 m) were randomly selected, and the vertical distance from the submarine to the observation point was calculated. The results are shown in Table 1 below. To verify the robustness of the algorithm, errors of ±5 m and ±50 m were randomly added to the coordinates of extreme points, and the results are shown in Table 2 and Table 3.

Table 1 below shows vertical distances (m) from the submarine to the observation point deduced when there is no error.

TABLE 1

| Actual distance | 459.0 | 573.0 | 610.0 | 780.0 | 846.0 | 927.0 |
|---|---|---|---|---|---|---|
| Estimated distance | 458.3 | 573.7 | 610.9 | 781.0 | 846.7 | 927.3 |

Table 2 below shows vertical distances (m) from the submarine to the observation point deduced after adding the error of ±5 m.

TABLE 2

| Actual distance | 459.0 | 573.0 | 610.0 | 780.0 | 846.0 | 927.0 |
|---|---|---|---|---|---|---|
| Estimated distance | 460.6 | 571.6 | 611.6 | 778.5 | 844.6 | 928.0 |

Table 3 shows vertical distances (m) from the submarine to the observation point deduced after adding the error of ±50 m.

TABLE 3

| Actual distance | 459.0 | 573.0 | 610.0 | 780.0 | 846.0 | 927.0 |
|---|---|---|---|---|---|---|
| Estimated distance | 472.1 | 584.9 | 598.9 | 792.7 | 859.0 | 916.0 |

It can be seen from Table 1 that the maximum error of the calculated distance is less than 1 m, and the average relative error is 0.7%. This shows the feasibility of calculating the vertical distance from the submarine to the observation point by using the coordinates of horizontal extreme points. It can be seen from Table 2 that after the adding of the error of ±5 m to the coordinates of extreme points, the calculated distance error does not exceed 1.6 m at most, and the average relative error is 1.3%. It can be seen from Table 3 that after the adding of the error of ±50 m to the coordinates of extreme points, the calculated distance error is no more than 13.1 m and the average relative error is 11.1%. This shows that the method has desirable robustness and can be applied in a complex environment.

Although embodiments of the present disclosure have been described in detail, it should be understood that various changes, substitutions and alterations can be made herein without departing from the spirit and scope of the disclosure as defined by the appended claims.

Moreover, the scope of the present disclosure is not intended to be limited to the particular embodiments described here. As one of ordinary skill in the art will readily appreciate from the disclosure of the present disclosure that processes, machines, manufacture, compositions of matter, means, methods, or steps, presently existing or later to be developed, may perform substantially the same function or achieve substantially the same result as the corresponding embodiments described herein. Accordingly, the appended claims are intended to include within their scope such processes, machines, manufacture, compositions of matter, means, methods, or steps.

What is claimed is:

1. A method comprising:
    determining a horizontal position coordinates (X, Y) of a submarine according to a position of a central extreme point and a central position between extreme points of non-diagonal components of a gradient tensor, the coordinates (X, Y) being in a space rectangular coordinate system established using a submarine model,
    wherein the submarine model comprises a hemispherical head (1), a middle cylindrical portion (4), a conical tail (3) and an internal cylindrical pressure-resistant cabin (2), and
    wherein the space rectangular coordinate system is established by taking a centroid of the middle cylindrical portion (4) as a coordinate origin, with a direction pointing to a bow of the submarine model as a forward direction of an X axis, a direction pointing to a port of the submarine model as a forward direction of a Y direction, and a vertical upward direction as a forward direction of a Z axis;
    determining a functional relation between a depth and extreme points of gravity gradient by using the submarine model, the gravity gradient generated by the submarine;
    deducing a depth of the submarine according to the extreme point of gravity gradient, and transferring to a corresponding coordinate system to obtain Z; and
    obtaining a position (X, Y, Z) of the submarine based on the coordinates (X, Y) and the depth of the submarine.

2. The method according to claim 1, wherein the gravity gradient generated by the submarine is divided into a first part and a second part, the first part is gravity gradients generated by a submarine shell, and the second part is a gravity gradient generated by a mass defect caused by the internal cylindrical pressure-resistant cabin (2) of the submarine.

3. The method according to claim 1, wherein as the depth of the submarine changes, horizontal coordinates of an extreme point of each gravity gradient component at a specific altitude change.

4. The method according to claim 1, wherein coordinates of extreme points with a vertical distance from the submarine to an observation point being 100-1000 m are calculated.

5. The method according to claim 1, wherein solution is performed by jointly using a plurality of extreme points of gradient components.

* * * * *